Figure 2:
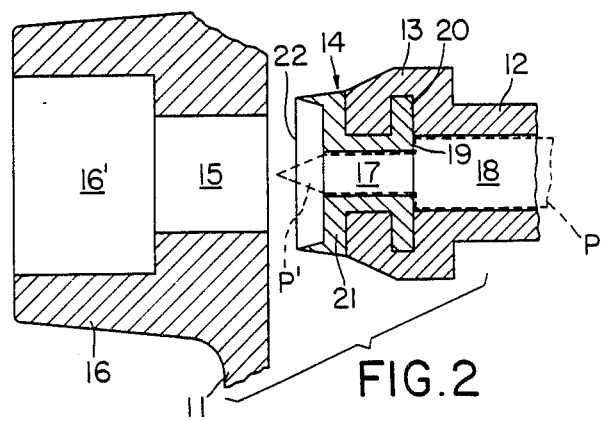

United States Patent [19]
Wassilieff

[11] Patent Number: 4,653,208
[45] Date of Patent: Mar. 31, 1987

[54] EAR TAGS

[76] Inventor: Alexander Wassilieff, 33 Peters Avenue, Palmerston North, New Zealand

[21] Appl. No.: 861,526

[22] Filed: May 9, 1986

Related U.S. Application Data

[60] Continuation of Ser. No. 495,448, May 17, 1983, abandoned, which is a division of Ser. No. 103,709, Dec. 14, 1979, abandoned.

[30] Foreign Application Priority Data

Dec. 18, 1978 [NZ] New Zealand ............... 189194

[51] Int. Cl.⁴ .................... A01K 11/00; G09F 3/06
[52] U.S. Cl. ............................... 40/301; 128/305; 128/330
[58] Field of Search ............... 128/330, 329 R, 305, 128/753, 754; 40/300, 301, 302; 119/135; 227/140; 30/316; 24/150 P, 155 R

[56] References Cited

U.S. PATENT DOCUMENTS

| | | | |
|---|---|---|---|
| 547,424 | 10/1895 | Eaton | 40/301 |
| 915,355 | 3/1909 | Jackson | 40/301 |
| 1,347,868 | 7/1920 | Nichols | 40/301 |
| 2,864,370 | 12/1958 | Alvos | 128/329 X |
| 3,731,414 | 5/1973 | Murphy et al. | 40/301 |
| 4,209,924 | 7/1980 | Fearing | 40/301 |

FOREIGN PATENT DOCUMENTS

| | | | |
|---|---|---|---|
| 6938697 | 1/1970 | Fed. Rep. of Germany | 40/301 |
| 2407641 | 8/1975 | Fed. Rep. of Germany | 40/300 |
| 2417936 | 9/1979 | France | 128/330 |
| 65208 | 8/1942 | Norway | 40/301 |
| 1509565 | 5/1978 | United Kingdom | 40/300 |
| 2041833 | 9/1980 | United Kingdom | 40/300 |

*Primary Examiner*—Michael H. Thaler

[57] ABSTRACT

A tag for fastening to an animal's ear, the tag having a body with an opening therein and a shaft having a head portion at one end thereof, the head portion in use being passed through the ear and into the opening. In order to provide an opening in the ear of the animal which is of sufficient size to accommodate the shaft, the extremity of the head portion is provided with an annular cutting edge. In order to prevent slippage of the position of the tag against the animal's ear during initial stages of application of the tag, a locating spike is provided which projects axially of and beyond the annular cutting edge.

28 Claims, 5 Drawing Figures

EAR TAGS

This application is a continuation of co-pending application Ser. No. 495,448 filed May 17, 1983 abandoned, which in turn is a divisional of then co-pending application Ser. No. 103,709 filed Dec. 14, 1979 abandoned.

This invention relates to an animal ear tag.

Many different designs of animal ear tags are known in the art. A popular method of attaching such tags to the ear of the animal is to use a snap lock device comprising male and female coupling members. The male member is usually a headed shaft which is engageable in an opening, said opening being the female coupling member of the snap lock device. The headed shaft and opening may be formed as part of separate tag components or as part of a single component. An example of the former type of tag is the Allflex (R.T.M.) tag which is disclosed in U.S. Pat. No. 3,731,414 whilst an example of the latter tag can be found in U.S. Pat. No. 4,060,922. Other tags which are of one or two piece construction normally have a rigid headed shaft as opposed to the hollow and resilient shaft of the tags disclosed in the aforementioned patent specifications.

Tags of this type are normally applied by forcing the headed shaft through the ear of the animal and into the opening. The extremity of the head portion of the shaft (usually conical in shape) punctures or pierces the ear, the so formed hole being spread by continuing forward motion of the head.

An undesirable problem, however, exists with these types of tags especially when applied to animals such as sheep, goats, etc. It has been found that sheep are highly prone to developing necrosis in the ear after being tagged. The problem can arise from several factors, poor hygiene standards adopted at the time of tagging, lack of air circulation around the wound to expedite healing and irritation of the wound by strands of wool that pass from one side of the ear through the wound where they are trapped in the snap-lock device. This last factor is accentuated when the tag is applied in such a manner that the headed shaft penetrates the ear from the back. This is the woolly side so inevitable wool is pushed through the wound and into the opening of the snap lock device on the inner side of the ear where it remains tightly trapped. The tissue then contracts onto the shaft and so inhibits ventilation.

Even when adequate hygiene standards are applied necrosis still occurs which indicates that necrosis is caused by the pierced ear being a tight fit on the shaft and whilst the wool may not necessarily have passed through the wound a small amount is still tightly held by the snap-lock and this holds the tag firmly against the ear. The overall effect is to restrict the air circulation around the area of the wound as well as irritation of the wound by any wool which may have passed therethrough.

It has been found that if an opening is pre-punched in the ear and the tag then applied necrosis of the ear is markedly reduced. With a preformed opening no wool passes through the wound nor catches in the snap-lock device as the wool is cut away during formation of the opening. As a distinct opening rather than a puncture is formed in the pre-punching the shaft does not fit tightly in the ear. The overall result is that there is no wool irritation of the wound and air can circulate around the wound.

Pre-punching means that two distinct operations in the tagging procedure are necessary. The present invention, however, allows a tag to be applied in a single operation which ensures that an opening is punched in the ear of an animal simultaneously with the male member of the tag passing through the ear.

Broadly, in one aspect the invention provides a tag for an animal's ear, the tag having means for fastening thereof to the ear, said fastening means including a resilient means defining an opening and a shaft having a head portion at one end thereof, said head portion in use being passed through the ear of the animal and aforesaid opening characterized in that punching means for removing a portion of the ear is provided near the extremity of said head portion, said punching means being provided by a cutting edge formed near the extremity of the head portion, said cutting edge being of complementary shape to said opening but of overall larger dimensions, said head portion further comprising at its extremity a locating means for preventing slippage of the position of said tag against the animal's ear during initial stages of application of said tag.

Broadly in a second aspect, the invention provides a tag for an animal's ear, the tag having means for fastening thereof to the ear, said fastening means including a resilient means defining an opening and a shaft having a head portion at one end thereof, said head portion in use being passed through the ear of the animal and aforesaid opening characterized in that punching means for removing a portion of the ear is provided at the extremity of said head portion, said punching means being provided by a cutting edge formed at the extremity of the head portion, which is a complementary shape to said opening and further comprising at its extremity a locating means for preventing slippage of the position of said tag against the animal's ear during initial stages of application of said tag.

The punching means can be formed integrally with said head portion, when preferably the tag is constructed from a rigid or substantially rigid material, or an integral part of a hard material tip moulded into the head portion. With the hard material tip embodiment, the tag can be of a resilient material with the shaft of a tubular formation, the bore of which opens into a bore of lesser diameter in the tip. A shoulder is thus formed internally in the head portion so that a shoulder on an applicator pin can engage therewith when the pin is located in the shaft.

Preferably the cutting edge is annular and of a diameter which is greater than the diameter of the opening. Preferably, the diameter of the cutting edge is less than the greatest cross-sectional diameter of the head portion.

The cutting edge can be formed by an annular wall which is tapered to a sharp point. In a further form, the cutting edge can be formed by a recess in the extremity of the head portion. In a further form the extremity of the head portion is a flat surface which lies in a plane perpendicular to the longitudinal axis of the shaft, the cutting edge being the peripheral edge of the flat surface.

Figure 1:
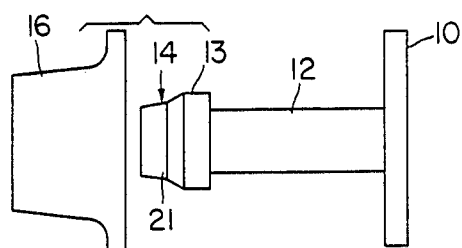
Figure 3:
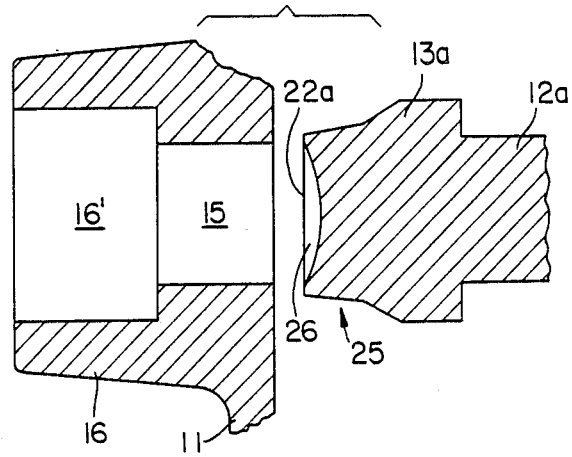
Figure 4:
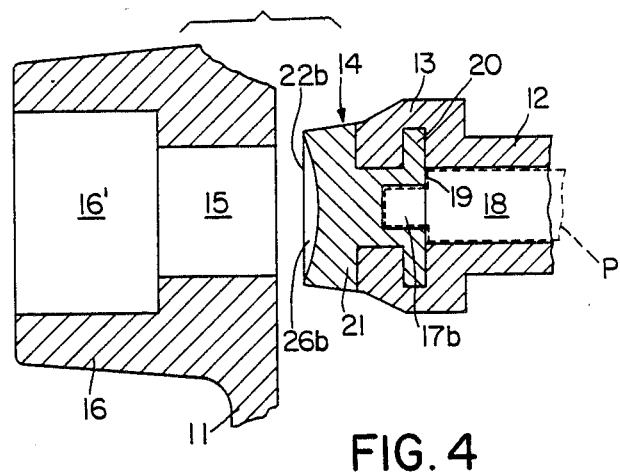
Figure 5:
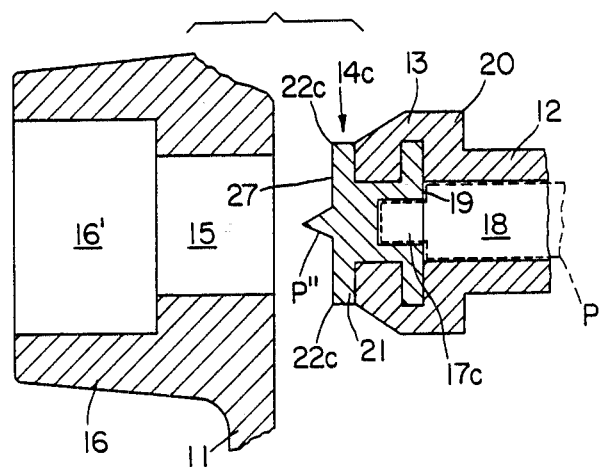

In more fully describing the invention, reference will be made to the accompanying drawings in which:

FIG. 1 is a side elevation view of a two component tag embodying punching means according to the invention, and FIG. 2 is an enlarged sectioned view of part of the tag components of FIG. 1, FIG. 3 is a cross section view similar to FIG. 2 but showing a second form of the invention, FIG. 4 is a cross section view similar to FIGS. 2 and 3 but showing a third form of the invention, and FIG. 5 is a still further cross section view showing a fourth form of the invention.

The tag according to the present invention is illustrated as being of the type disclosed in the afore-mentioned U.S. Pat. No. 3,731,414 in that it is formed by two components 10 and 11 each of which is constructed from a moulded resilient plastics material such as polyurethane. Component 10 is formed with a shaft 12 which has a head portion 13. Integrally moulded into the head portion 13 is a hard material tip 14 (which will be hereinafter described). The second component 11 has an opening or hole 15 which is preferably surrounded by a boss or wall 16 which is of a greater diameter than that of opening 15.

The present invention is, however, not restricted to this form of tag. Other configurations of tag such as one piece resilient tags or two piece rigid material tags can be employed when the fastening means of these configurations include a male member which is passed through the ear of the animal and into an opening to form a snap-lock fastening device.

Referring to a form of the invention shown in FIG. 2 the tip 14 is preferably formed from a material such as brass aluminium or rigid plastics. The tip 14 has a through bore 17 which is coaxial with the hollow centre (formed by a bore 18 of circular cross-section) of shaft 12. The diameter of bore 17 is less than that of bore 18 so that an internal shoulder 19 is formed in head portion 13. Bore 17 need not pass completely through tip 14 but could be blind as illustrated for example in FIG. 4. As with the tag of U.S. Pat. No. 3,731,414 the applicator tool has a pin P (see dotted detail) which passes through bore 18 so that its free end engages in bore 17. Pin P has a sharp end which projects from the tip 14 and includes a shoulder which engages with shoulder 19. To apply the tag the pin is engaged in shaft 12 and a driving force applied via pin P to the tip 14 with the pin shoulder engaging shoulder 19 and/or the end of the pin engaging the end of bore 17 when it is of the alternative closed bore configuration (once again see FIG. 4). Other configurations could be used to ensure a positive location of applicator pin P with tip 14.

Tip 14 has a first flange 20 which is embedded in head portion 13. A second or outer flange 21 is situated at and forms the extremity of the head 13 and has a projecting annular wall which tapers to a sharp edge. This annular cutting edge 22 is concentric with bore 17 and is of a diameter which is less than the greatest cross-section of head portion 13 and, in the preferred form, greater than the diameter of opening 15 in component 11. The difference in diameter between opening 15 and edge 22 can vary depending on the materials used to form the tag components.

In use components 10 and 11 are installed in a suitable applicator such as described in U.S. Pat. No. 3,812,859. The point P' of pin P extends beyond the tip 14 and acts as a location-guide during the initial application stages, so that the applicator does not slip. After installing the components in the applicator it is recommended that the whole apparatus be dipped into a disinfectant.

The stem 12 is then presented to the ear and when centred the application is made with a smooth firm pressure. The cutting edge 22 engages the ear and with the area of component 11 surround opening 15 forming an anvil or pressure pad the cutting edge 22 cuts out a plug of tissue so forming a hole in the ear which in the form shown is of a diameter slightly greater than the external diameter of shaft 12. The head portion 13 following tip 14 passes through the opening in the ear, through opening 15 and finally engages within cavity 16'. The plug of tissue falls from tip 14 once it has passed through opening 15 and into cavity 16'.

Tip 14 with cutting edge 22 thus forms a punch. The action of relative movement of components 10 and 11 caused by the applicator traps the animal's ear between the cutting edge 22 and the stiff but elastomeric component 11. Further movement causes the tip to cut through the ear tissue and wool so creating the aforementioned plug which sits against the front of the tip 14. As the tip 14 continues to move the plug passes through hole 15 under pressure so that it commences to open the hole up to facilitate the through passage of the tip which is of larger diameter. The plug provides a barrier between cutting edge 22 and the material surrounding hole 15 so as to prevent undue damage by the cutting action of edge 22.

Component 11 now has an additional function other than to form a snap-lock device and provide a means of identification by say number or symbol indicia thereon. This additional function is to form an anvil, pressure pad or die for the punching action of the cutting tip 14.

As mentioned above the configuration of the hollow stem is only one preferred form. For example the invention is also applicable to rigid type tags where the material used to construct the tag is of a rigid nature e.g. nylon. As an alternative a two component tag could be formed with the male component being of a rigid material and the female component of a flexible material. The head 13a of such a tag could be constructed as shown in FIG. 3 where the outer extremity 25 of the head is provided with an integral cutting edge 22a by forming extremity 25 with a dished recess 26. The shaft 12a is solid due to the use of a rigid material.

A still further example is shown in FIG. 4 where the construction is similar to those shown in FIGS. 1 and 2. However, cutting edge 22b is formed by a concave or dished recess 26b in the hard material tip 14. In this form the tag is shown as having a blind bore 17b.

Referring to FIG. 5, a fourth embodiment is shown. In this form the hard tip 14c has a flat surface 27 at its extremity. The cutting edge is formed by the peripheral edge 22c of the tip. With this form the pin P can extend right through as shown in FIG. 2 or else terminate in a blind bore as shown in FIG. 4. By way of a further example, however, pin P terminates in a blind bore 17c and a locating guide point P" is formed as an integral part of tip 14c.

Other configurations of the extremity of the headed shaft can be employed as the configurations described herein are by way of example and the invention is not limited thereto.

The tag is not restricted to use only with sheep as it is applicable to all animal tagging. An opening in the animal's ear is punched out at the same time as the tag is applied the shaft of the snap lock fastening locates in an opening which does not tightly grip the shaft. This allows access of air to the wound to speed up the healing process.

I claim:

1. A tag for an animal's ear, the tag having means for fastening thereof to the ear, said fastening means including a resilient means defining an opening and a shaft having a head portion at one end thereof, said head portion in use being passed through the ear of the animal and aforesaid opening and characterized in that punching means for removing a portion of the ear is provided near the extremity of said head portion, said punching means being provided by a cutting edge formed near the extremity of the head portion, said cutting edge being of complementary shape to said opening but of overall larger dimensions, said head portion further comprising at its extremity a locating means for preventing slippage of the position of said tag against the animal's ear during initial stages of application of said tag, the locating means being spaced from and not in contact with the cutting edge.

2. The tag of claim 1, wherein said locating means is a conical spike.

3. The tag of claim 1, wherein said punching means further includes an annular surface disposed inwardly of said cutting edge.

4. The tag of claim 3, wherein said cutting edge defines a peripheral edge of said annular surface.

5. The tag of claim 4, further including a planar confronting surface on said resilient means and bounding said opening therein, said planar confronting surface being arranged essentially parallel to said annular surface.

6. The tag of claim 3 wherein the locating means is positioned approximately centrally on the annular surface.

7. The tag of claim 1 wherein the locating means is separate from the head portion.

8. The tag of claim 1 wherein the locating means is integral with the head portion.

9. A tag for an animal's ear, the tag having fastening means for fastening thereof to the ear, said fastening means compising:
resilient means defining an opening, the resilient means including a planar confronting surface thereon bounding the opening; and
a shaft having a head portion at one end thereof, said head portion in use being passed through the ear of the animal and through the opening, the head portion further having a punching means near the extremity thereof for removing a portion of the ear, the punching means being provided by a cutting edge and an annular surface disposed inwardly of the cutting edge and substantially parallel to the planar confronting surface of the resilient means, the cutting edge being defined by a peripheral edge of the annular surface and being of complementary shape to the opening but of overall larger dimensions; the head portion further comprising at its extremity a locating means for preventing slippage of the position of the tag against the animal's ear during the initial stage of aplication of the tag, the locating means being spaced from and not in contact with the cutting edge.

10. An animal tag comprising:
(a) a body with an opening therein; and
(b) a shaft having a head portion at one end thereof, said head portion in use being passed through part of the animal's ear and the aforesaid opening and including an annular cutter having a cutting edge with a peripheral edge of a diameter larger than the diameter of said opening and a locating spike projecting axially of and beyond said cutting edge of said annular cutter, the locating spike being spaced from and not in contact with the cutting edge of the annular cutter.

11. The animal tag of claim 10, wherein said body has a planar surface confronting said head portion before said head portion is urged through said opening, wherein an annular surface is provided on the annular cutter and said annular surface is planar and wherein said planar confronting surface is disposed essentially parallel to said annular surface of the annular cutter.

12. The animal tag of claim 11, wherein said opening is circular in cross section and arranged essentially coaxially to both said annular surface and said locating spike.

13. A tag for an animal's ear, the tag having means for fastening thereof to the ear, said fastening means including a resilient means defining an opening and a shaft having a head portion at one end thereof, said head portion in use being passed through the ear of the animal and aforesaid opening and characterized in that a cutting edge for removing a portion of the ear is provided near the extremity of the head portion, said cutting edge being of complementary shape to the opening, said head portion further comprising at its extremity a locating means for preventing slippage of the position of the tag against the animal's ear during initial stages of application of the tag, the locating means being spaced from and not in contact with said cutting edge.

14. The tag of claim 13, wherein said locating means is a conical spike.

15. The tag of claim 14, wherein said punching means further includes an annular surface disposed inwardly of said cutting edge.

16. The tag of claim 15, wherein said cutting edge defines a peripheral edge of said annular surface.

17. The tag of claim 16, further including a planar confronting surface on said resilient means and bounding said opening therein, said planar confronting surface being arranged essentially parallel to said annular surface.

18. The tag of claim 15, wherein the locating means is positioned approximately centrally of the annular surface.

19. The tag of claim 15 wherein the locating means is separate from the head portion.

20. The tag of claim 15, wherein the locating means is integral with the head portion.

21. An animal tag comprising a resilient body with an opening therein and a shaft having a head portion at one end thereof, said head portion in use being passed through part of the animal and said aforesaid opening and including an annular cutter having a cutter edge and a locating spike projecting axially of and beyond said cutting edge of said annular cutter, the locating spike being spaced from and not in contact with the cutting edge of the annular cutter.

22. The animal tag of claim 21, further including a planar annular surface provided on said cutter between said cutting edge and said locating spike.

23. The animal tag of claim 22 wherein the locating spike is separate from the head portion.

24. The animal tag of claim 22 wherein the locating spike is integral with the head portion.

25. A tag for an animal's ear, the tag having fastening means for fastening it to the animal's ear, said fastening means comprising means defining an opening and a shaft having a head portion at one end thereof, said head portion in use being passed through the ear of the animal and through the opening, the head portion further having punching means near the extremity thereof for removing a portion of the ear, the punching means being defined by an annular cutting edge of complementary shape to the opening, the head portion further including at its extremity a locating means for preventing slippage of the position of the tag against the animal's ear during initial stages of application of the tag, the locating means being spaced from and not in contact with the cutting edge.

26. The tag of claim 25, wherein the locating means is positioned approximately centrally of the annular surface.

27. The tag of claim 25 wherein the locating means is separate from the head portion.

28. The tag of claim 25, wherein the locating means is integral with the head portion.

* * * * *

UNITED STATES PATENT AND TRADEMARK OFFICE
CERTIFICATE OF CORRECTION

PATENT NO. : 4,653,208
DATED : March 31, 1987
INVENTOR(S) : ALEXANDER WASSILIEFF It is certified that error appears in the above-identified patent and that said Letters Patent are hereby corrected as shown below:

Front Page, left-hand column, after inventor's name, please insert the assignment data as follows:

[73] Assignee:        Allflex International Limited,
                            Palmerston North, New Zealand ---.

Signed and Sealed this

Eighth Day of March, 1988

*Attest:*

DONALD J. QUIGG

*Attesting Officer*      *Commissioner of Patents and Trademarks*